US009753171B2

United States Patent
Welch et al.

(10) Patent No.: US 9,753,171 B2
(45) Date of Patent: Sep. 5, 2017

(54) FORMATION COLLAPSE SENSOR AND RELATED METHODS

(71) Applicant: BAKER HUGHES INCORPORATED, Houston, TX (US)

(72) Inventors: John C. Welch, Spring, TX (US); Ke Wang, Sugar Land, TX (US); Carlos A. Prieto, Katy, TX (US); Zhiyue Xu, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 211 days.

(21) Appl. No.: 14/515,075

(22) Filed: Oct. 15, 2014

(65) Prior Publication Data

US 2016/0109607 A1    Apr. 21, 2016

(51) Int. Cl.
    G01V 1/52      (2006.01)
    G01V 1/44      (2006.01)
    E21B 47/09     (2012.01)

(52) U.S. Cl.
    CPC .............. *G01V 1/52* (2013.01); *E21B 47/091* (2013.01); *G01V 1/44* (2013.01)

(58) Field of Classification Search
    CPC ........................................................ G01V 1/52
    See application file for complete search history.

(56) References Cited

U.S. PATENT DOCUMENTS

| 5,017,867 A | * | 5/1991 | Dumais ................. G01B 7/003 324/207.13 |
| 7,357,021 B2 | | 4/2008 | Blacklaw et al. |
| 8,746,074 B2 | | 6/2014 | Lambert et al. |
| 2009/0163940 A1 | * | 6/2009 | Sliwa ............... A61B 17/22012 606/159 |
| 2013/0213129 A1 | | 8/2013 | Kumar et al. |
| 2014/0116715 A1 | * | 5/2014 | Sipila ..................... E21B 47/06 166/336 |
| 2014/0177388 A1 | * | 6/2014 | D'Angelo ........... E21B 47/0002 367/35 |
| 2015/0096745 A1 | | 4/2015 | Wang et al. |
| 2015/0096942 A1 | | 4/2015 | Wang et al. |
| 2015/0098487 A1 | | 4/2015 | Wang et al. |
| 2015/0098488 A1 | | 4/2015 | Wang et al. |
| 2015/0337646 A1 | | 11/2015 | Wang et al. |

* cited by examiner

*Primary Examiner* — Ryan Walsh
(74) *Attorney, Agent, or Firm* — Mossman, Kumar & Tyler, PC

(57) ABSTRACT

A sensor for detecting well conditions includes at least one transducer positioned at an end of the carrier. The carrier is positioned adjacent to and exposed to a wellbore wall and the transducer is configured to generate mechanical waves in the carrier. The carrier conveys the mechanical waves and has one or more sections initially free of a physical deformation that causes reflection of the mechanical waves. The sections physically deform to cause reflected mechanical waves when subjected to a loading from the formation. The transducer generates a signal representative of reflected mechanical waves received at the end of the carrier. The location of the loading is estimated using the received signal.

20 Claims, 5 Drawing Sheets

FORMATION COLLAPSE SENSOR AND RELATED METHODS

BACKGROUND OF THE DISCLOSURE

1. Field of the Disclosure

This disclosure relates generally to oilfield downhole tools and more particularly to methods and devices for sensing a downhole condition in a wellbore intersecting a formation.

2. Description of the Related Art

Wellbore operations such as drilling, wireline logging, completions, perforations and interventions are performed to produce oil and gas from underground reservoirs. These operations are done in a wellbore that can extend thousands of feet underground. Many operations may be affected by changes in downhole conditions, such as formation collapse. In some aspects, the present disclosure is directed to methods and devices for detecting and locating such undesirable downhole conditions.

SUMMARY OF THE DISCLOSURE

In one aspect, the present disclosure provides an apparatus for sensing a downhole condition in a wellbore intersecting a formation. The apparatus may include a carrier positioned adjacent to and exposed to a wellbore wall, where the carrier is configured to convey mechanical waves and has at least one section initially free of a physical deformation that causes reflection of the mechanical waves, where the at least one section physically deforms to cause reflected mechanical waves when subjected to a loading from the formation, and at least one transducer positioned at an end of the carrier, where the at least one transducer is configured to excite the mechanical waves and generate a signal representative of reflected mechanical waves received at the end of the carrier.

In another aspect, the present disclosure provides a method of sensing a downhole condition in a wellbore intersecting a formation. The method may include generating a mechanical wave at an end of a carrier positioned exposed to a wellbore wall, receiving a reflected mechanical wave at the end of the carrier, monitoring a signal representative of the reflected mechanical wave, and detecting a location of a load applied by the formation to the carrier using the signal.

Illustrative examples of some features of the disclosure thus have been summarized rather broadly in order that the detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein:

FIG. 3B show a carrier wrapped around an exemplary liner and not exposed to a well cave-in;

FIG. 3C show a carrier wrapped around an exemplary liner and exposed to a well cave-in;

DETAILED DESCRIPTION OF THE DISCLOSURE

The present disclosure relates to an apparatus and methods for detecting undesirable downhole conditions. Undesirable downhole conditions include, but are not limited to, well erosion, well collapse, well washout, tool decentralization, wellbore shift, tool slip, etc. When detected early enough, further problems such as damage to wellbore equipment can be alleviated. In addition, other mitigatory measures can be taken as a subsequent well treatment and well design.

In embodiments, the formation collapse sensor detects these well conditions by using mechanical waves conveyed by a carrier disposed along one or more sections of a wellbore. A transducer detects mechanical waves that may be reflected from a location along the carrier. These reflected waves may indicate the presence of an undesirable well condition such as formation collapse. Illustrative formation collapse sensors are described below.

Figure 1:
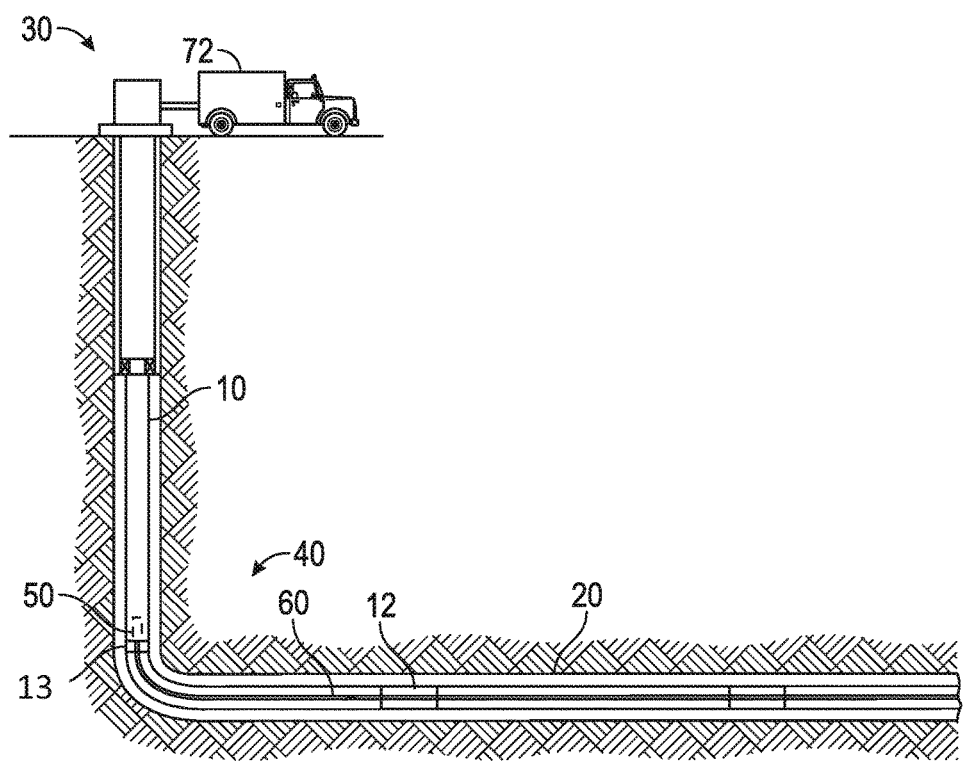
FIG. 1 shows an exemplary transducer and carrier assembly deployed in a wellbore according to the present disclosure.

FIG. 1 shows a well 30 that uses a formation collapse sensor 40 to detect formation collapse at one or more locations along a completion system. In one embodiment, the formation collapse sensor 40 may include a transducer 50 and the carrier 60 positioned adjacent to a wellbore tubular such as a liner 10 and/or a completion device 12 in a wellbore 20. The carrier 60 is exposed so that invasion of the rock and earth from the formation can apply a loading onto one or more locations along the carrier 60. In an openhole completion or liner completion, the transducer 50 and the carrier 60 may be attached to the liner 10 and/or the completion 12 by a clamp 13, or disposed inside the liner 10 and/or the completion 12. Alternatively, the assembly may be run with a liner hanger and a tieback or some other technique. For easiness of understanding and for convenience, the liner 10 and completion 12 will be used interchangeably for the rest of this disclosure.

Figure 2:
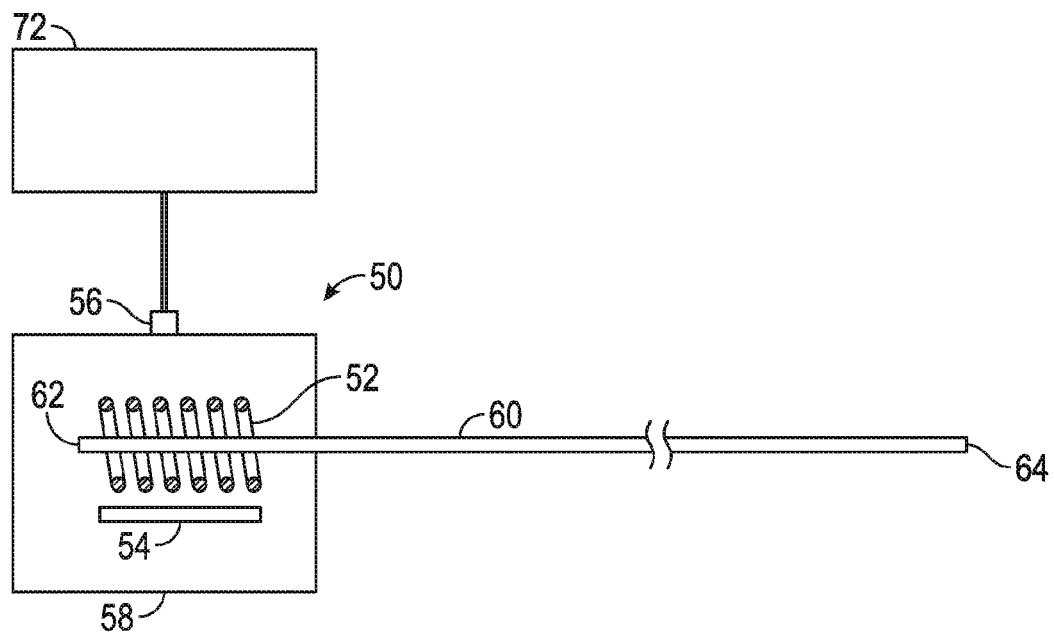
FIG. 2 shows exemplary components of an exemplary transducer and carrier assembly.

The transducer 50 may use magnetostrictive technology to excite mechanical waves, such as sonic waves and other pressure waves, in the carrier 60 and to detect reflected mechanical waves in the carrier 60. Illustrative transducers and related devices are discussed in the co-pending applications with U.S. Ser. No and filing date, respectively, the contents of which are incorporated by reference for all purposes: Ser. No. 14/267,255, May 1, 2014, Ser. No. 14/046,332, Oct. 4, 2013; Ser. No. 14/282,825, May 20, 2014; Ser. No. 14/326,013, Jul. 8, 2014; and Ser. No. 14/328,427, Jul. 10, 2014. FIG. 2 shows an exemplary transducer 50. The transducer 50 has a coil 52 contained within a housing 58. A magnet 54 is positioned outside the coil 52. The coil 52 and the optional magnet 54 serve to transform current into a sonic pulse and vice-verse. A portion of the carrier 60 extends into the housing 58 and further extends into the coil 52. In an exemplary embodiment, the coil 52 may be wrapped around a spool with a hollow center.

In another embodiment, the transducer 50 may utilize combinations of coils 52 and/or magnets 54 to generate sonic waves in the carrier 60. The coils 52 may be oppositely-wound or wound in the same direction, and connected in series. Alternatively, a piezoelectric material, a quantum-tunneling composite or a shape memory alloy may be used with or instead of the coil 52.

The carrier 60 is medium to convey mechanical waves along the wellbore. The carrier 60 may be a wire, rod, tube, fiber, or other elongated and thin member. Optionally, the carrier 60 may have a tube, sheath or armor to allow loadings above a threshold value to deform the carrier 60. That is, the sheathing is specifically engineered to allow loadings having predetermined characteristics to deform the carrier 60.

The carrier 60 is configured to initially generate a reflected wave only from a distal end 64. Thus, the carrier 60 does not have any engineered deformations, such as notches, that can cause reflected mechanical waves in the length of the carrier 60 that is used to detect well conditions. The carrier 60 may be of any suitable size, for example, may have a diameter of less than one millimeter, and a length of 100 meter or longer. One end of the carrier 60 is operatively fixed to the transducer 50. The carrier 60 is preferably made of a ferromagnetic metal alloy, such as Ni—Fe. The carrier 60 may alternatively be made of elements from Group IVB (such as Titanium), Group VIIB (such as Rhenium), Group VIIIB (such as Fe, Ni, Rhodium) in the periodic table, or alloys such as Vicalloy, stainless steel, nickel alloy and thoriated tungsten.

Figure 2A:
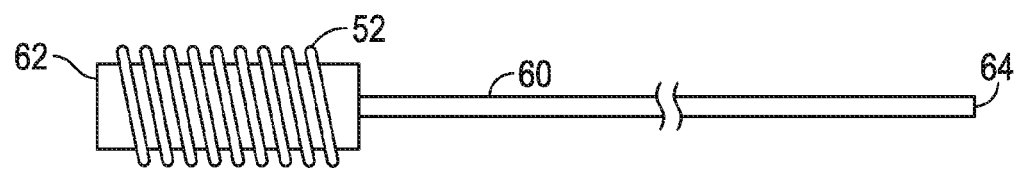
FIG. 2A shows an exemplary carrier with different cross-sectional areas.

In some embodiments, the carrier 60 may have constant cross-sectional area throughout its length as shown in FIG. 2. Referring now to FIG. 2A, in other embodiments, the cross-sectional area of the carrier 60 near a distal end 64 may be smaller than the cross-sectional area near a proximal end 62 at the transducer 50. The larger cross-sectional area near the proximal end 62 may aid in generating stronger mechanical waves. The reduced cross-sectional areas help limit the loss of signal strength due to attenuation. The cross-section of the carrier 60 may have a circular, elliptical, or another similar shape. The cross-sectional area of the carrier 60 may decrease step by step or gradually, i.e. may be tapered. Optionally, only a portion of the carrier 60 may have a varying cross-sectional area.

Figure 3A:
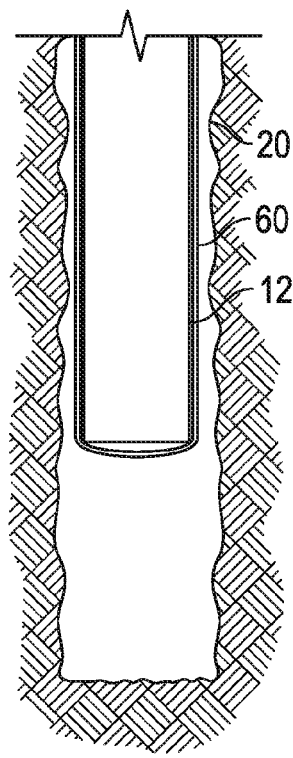
FIG. 3A shows an exemplary carrier deployed axially in a well.
Figure 3B:
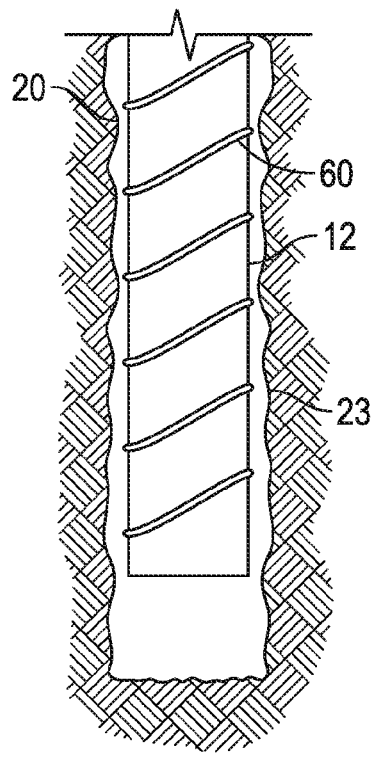
Figure 3C:
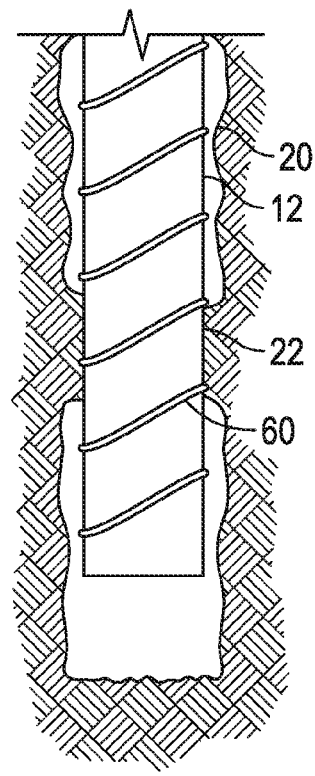

The carrier 60 lies longitudinally along the wellbore 20 and terminates at desired depth along the bottomhole assembly. The carrier 60 may be attached to or detached from the liner 10. Alternatively, as depicted in FIG. 3A, the carrier 60, may loop around the completion 12 and terminate at a depth along the completion 12. In another embodiment, as shown in FIG. 3B-C, the carrier 60 may be entirely or partially wrapped around the completion 12. The carrier 60 as wrapped, covers a larger detection area around the circumference of the completion 12 along a certain well depth. Therefore, the carrier 60, as wrapped, may be more sensitive to wellbore effects at a certain length and/or azimuthal direction along the liner 10.

In some arrangements, the carrier 60 communicates with a surface control unit 72 through a communication line 70. The connector 56 connects the transducer 50 to the control unit 72. The control unit 72 processes, monitors and records the signals coming from the transducer 50. In addition, the control unit 72 may activate and/or energize the transducer 50.

FIG. 3B shows the wellbore 20 without a cave-in 22, and FIG. 3C shows the wellbore 20 with the cave-in 22. As shown in FIG. 3B, the carrier 60 is positioned adjacent to and exposed to a wellbore wall 23. This positioning is to allow a loading from the formation caused by collapse of the wellbore wall 23 to deform the carrier 60. This physical deformation causes reflected mechanical waves in the carrier 60. The carrier 60 may abut the liner 10, may be under a layer, e.g., a screen, or abut the wellbore 20 without any intervening objects. When there is a cave-in 22, as shown in FIG. 3C, the carrier 60 is compressed at that location. From herein, the cave-in 22 will indicate the deformation of the wellbore 20. It should be understood that a tool shift or movement of the completion tool 12 will load the carrier 60 in the same way as the cave-in 22. Thus, a cave-in 22 is merely illustrative of one way in which the carrier 60 may be loaded and deformed.

An illustrative method for detecting formation collapse or other well condition will be discussed with reference to FIGS. 1, 2, 3C and 4A-B. In some situations, mechanical waves reflected back to the transducer 50 from a location along the carrier 60 may signify a cave-in 22. To initiate the wave propagation process, the control unit 72 generates an electrical signal that is applied to the coil 52. The electrical signal may, for example, be a pulse, a square wave, or any other suitable waveform with any suitable frequency. The electrical signal sent from the control unit 72 is received in the transducer 50 and generates a changing magnetic field, causing magnetostriction on the carrier 62 within the housing 58. The magnetostriction generates outgoing mechanical waves (e.g., a sonic pulse) that propagate from the proximal end 62 along the carrier 60 towards the distal end 64.

Figure 4A:
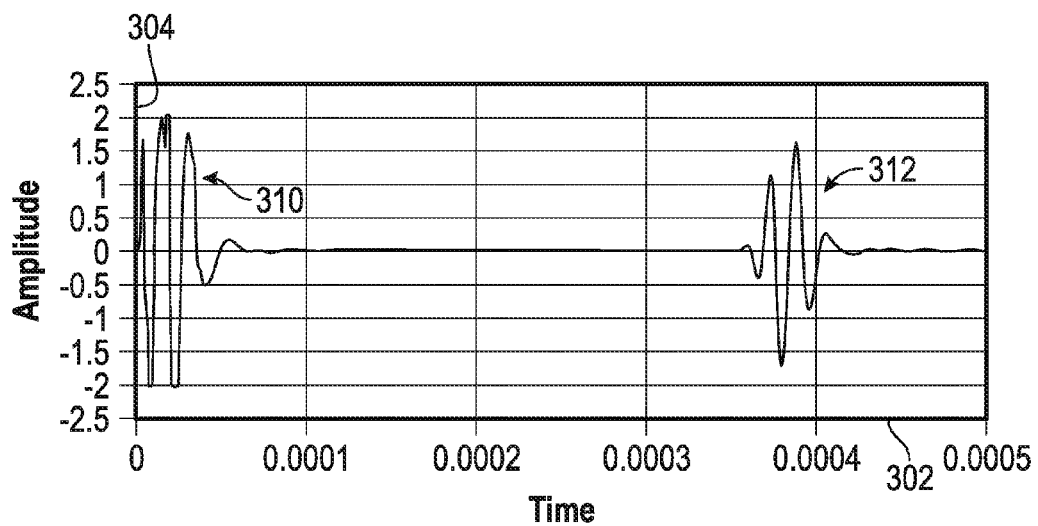
FIG. 4A-4B show a voltage response of the transducer and carrier assembly when not exposed to a load and exposed to a load, respectively.
Figure 4B:
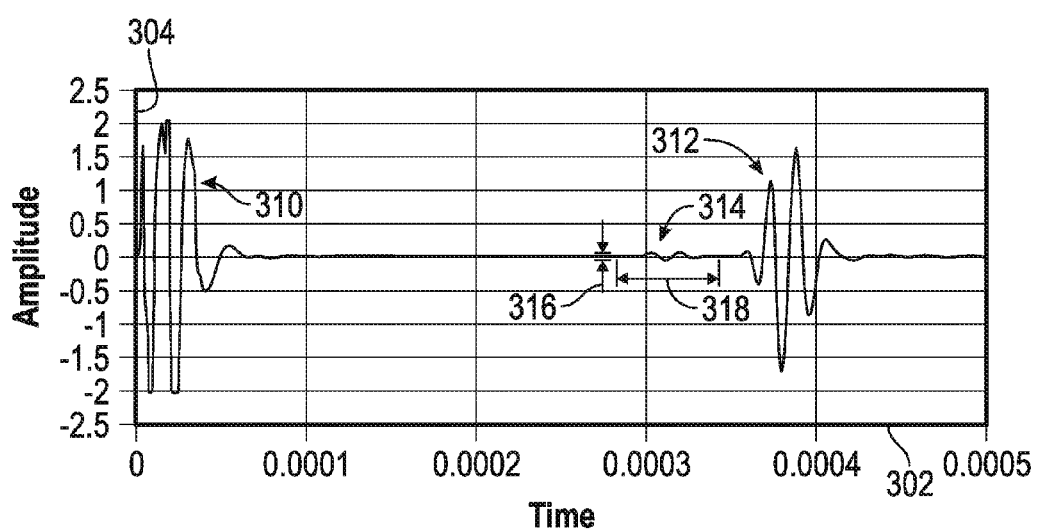

FIG. 4A-B show the excitation at the transducer 50 with respect to a reference voltage plotted against time 302. FIG. 4A depicts the output 304 of the transducer 50 when the carrier 60 is free from loading caused by the formation or unwanted tool movement. Received electrical signal from the control unit 72 generates the excitation 310 at the transducer 50. The transducer 50 converts the electrical signal to the mechanical waveform. The wave form travels along the carrier 60 and is reflected back at the distal end 64. The reflected mechanical waveform travels along the carrier 60 back to the transducer 50. The reflected mechanical waveform excites the transducer 50 creating the reflected signal 312. Because the carrier 60 is initially free from physical deformation caused by loadings and engineered deformations, there are no other reflected signals other than the signal 312. The time it takes from exciting the carrier 60 until receiving the reflected signal 312 from the distal end 64 depends on the length of the carrier 60, the speed of sound of the carrier 60 material, ambient temperature, and other factors. The control unit 72 receives the reflected signal 312 and processes these signals to generate the information for characterizing an unwanted well condition.

FIG. 4B depicts the output 304 of the transducer 50 when some load is applied to the carrier 60. The wellbore cave-in 22 applies a load on the carrier 60 and deforms a portion of the carrier 60. Due to the changed cross-section of the carrier 60 at that portion, some of the mechanical waves are reflected back towards the proximal end 62. Therefore, the radial deformation of the carrier 50 with respect to a long axis the carrier 50 creates a reflection point. This radial deformation is not associated with an axial displacement of any external object. The reflected mechanical waves excite the transducer 50 and generate the load signal 314. The time it takes to receive the load signal 314 gives the distance waves travel between the transducer 50 and the cave-in 22.

When the carrier 60 is wrapped around the liner 10, the depth of the cave-in 22 can be correlated with the length of the carrier 60 based on the wraps.

In addition, the amplitude 316 of the load signal 314 may indicate the deflection, and therefore, the amount of the load due to cave-in 22. Also, the width 318 of the load signal may indicate the length of the cave-in 22 along the wellbore 20. Optionally, the loss of the strength of reflected signal 312 may indicate the properties of the cave-in 22. There may be multiple load signals 314 if multiple cave-ins 22 or other well conditions occur.

After the completion tool 12 and formation collapse sensor 40 are positioned in the wellbore 20, tests may be performed to obtain baseline measurements. For example, some parts of the wellbore 20 may already abut the carrier 60 within acceptable limits. An initial well-history run provides a baseline for false or ignorable load signals 314. Then, further taken load signals 314 may be compared to historical measurements.

It should be understood that the teachings of the present disclosure are susceptible to numerous variants. Certain non-limiting variations are described below.

Figure 5:
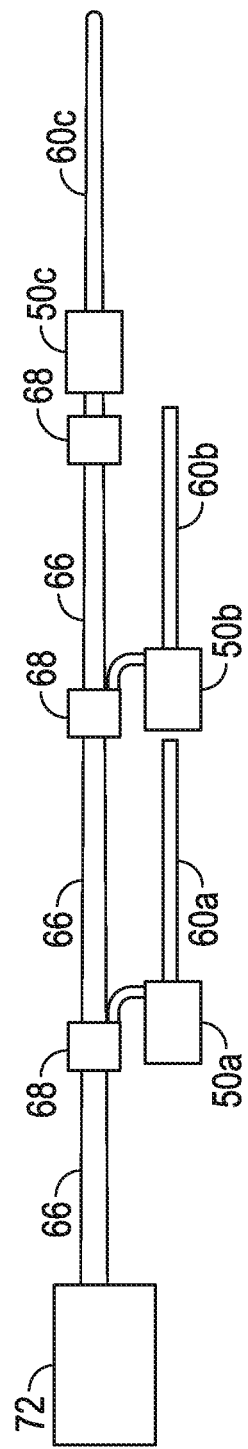
FIG. 5 shows an exemplary multiple transducer and multiple carrier assembly.

Referring to FIG. 5, in embodiments, the assembly may be composed of multiple transducers 50 and multiple carriers 60. Accordingly, splits 68 may connect an intermediate line 66 extending from the control unit 72 to the transducers 50. Each split 68 is coupled to a transducer 50 that is coupled to a carrier 60. Each carrier 60 spans a different length along the wellbore 20. Optionally, the carriers 60 may overlap over a certain length of the wellbore 20. In these embodiments, each transducer may pass certain electrical signals, e.g. a square, pulse, or at a certain frequency or amplitude, coming from the control unit 72. Therefore, the transducer 50 generates the reflected signal 312 or load signal 314 accordingly. Then, the control unit 72 may differentiate the signals according to the transducers 50.

Also, in some embodiments, the transducer 50 may be located at the surface instead of downhole. In that case, the carrier 60 may extend from the surface to a selected downhole depth. In still other embodiments, some or all of the control unit 72 may be located downhole.

The foregoing description is directed to particular embodiments of the present disclosure for the purpose of illustration and explanation. It will be apparent, however, to one skilled in the art that many modifications and changes to the embodiment set forth above or embodiments of different forms are possible without departing from the scope of the disclosure. It is intended that the following claims be interpreted to embrace all such modifications and changes.

We claim:

1. An apparatus for sensing a downhole condition in a wellbore intersecting a formation, comprising:
completion equipment having an exterior surface;
a carrier positioned on the exterior surface and adjacent to and exposed to a wellbore wall, the carrier configured to convey mechanical waves and having at least one section initially free of a physical deformation that causes reflection of the mechanical waves, the at least one section physically deforming to cause reflected mechanical waves when subjected to a loading from the formation; and
at least one transducer positioned at an end of the carrier, the at least one transducer is configured to excite the mechanical waves and detect reflections of the excited mechanical waves.

2. The apparatus of claim 1, wherein the completion equipment includes a tubing having the external surface.

3. The apparatus of claim 1, wherein the carrier has a first outer diameter at an end position proximate to the transducer and a second smaller outer diameter at a position distal to the transducer at distal end.

4. The apparatus of claim 3, wherein the carrier has the second smaller outer diameter at least along the majority of the length of carrier, and wherein a reduction of the diameter reduces the cross-section area where the mechanical waves travel.

5. The apparatus of claim 1, wherein the mechanical wave is an acoustic wave, wherein the at least one transducer is located at one of: (i) the surface, and (ii) a location adjacent to a wellbore assembly.

6. The apparatus of claim 5, wherein the transducer includes at least one of: (i) a magnetostrictive component, (ii) a piezoelectric material, (iii) a quantum-tunneling composite, and (iv) a shape memory alloy.

7. The apparatus of claim 1, further comprising a communication line, an at least one split connecting the communication line with an at least one transducer, and wherein the transducer communicates a signal representative of the reflected mechanical waves to the communication line.

8. The apparatus of claim 7, wherein the at least one split comprises a plurality of splits wherein each split has a separate carrier and a transducer.

9. The apparatus of claim 1, wherein the carrier is formed as one of: (i) a wire, (ii) a fiber, (iii) a rod, (iv) a tube, and (iv) a hollow wire.

10. The apparatus of claim 1, wherein the carrier is at least one of: (i) circumferentially wrapped along the exterior surface, and (ii) axially wrapped along the exterior surface.

11. A method for sensing a downhole condition in a wellbore intersecting a formation, comprising:
positioning a carrier in the wellbore and a wellbore wall;
generating a mechanical wave at an end of the carrier;
receiving a reflection of the generated mechanical wave at the end of the carrier;
monitoring a signal representative of the reflected mechanical wave; and
detecting a location of a load applied by the formation to the carrier using the signal.

12. The method of claim 11, wherein the location is estimated by measuring a time interval between producing the mechanical wave and receiving the reflected mechanical wave, and wherein estimating the location comprises using a speed of sound property of the carrier.

13. The method of claim 11, further comprising correlating a distance along the carrier from the end to the section subjected to the applied load with a depth of the wellbore.

14. The method of claim 11, further comprising correlating a magnitude of the load with an amplitude of the reflected wave.

15. The method of claim 11, further comprising detecting the load caused by at least one of: (i) a well erosion, (ii) a well collapse, (iii) a well washout, (iii) a tool decentralization, (iii) a wellbore shift, and (iv) a tool slip.

16. The method of claim 11, further comprising sensing the downhole condition at a plurality of locations along the wellbore by using a plurality of carriers.

17. The method of claim 11, further comprising comparing the reflected wave to a threshold wave.

18. The method of claim 11, further comprising correlating a time duration of the reflected wave with a distributed length of the load along the carrier.

19. The method of claim 11, further comprising: positioning the carrier on an exterior surface of completion equipment positioned in the wellbore; and circumferentially wrapping the carrier along the exterior surface.

20. The method of claim 11, further comprising: positioning the carrier on an exterior surface of completion equipment positioned in the wellbore; and axially wrapping the carrier along the exterior surface.

* * * * *